(12) United States Patent
Aggarwal et al.

(10) Patent No.: US 7,937,269 B2
(45) Date of Patent: May 3, 2011

(54) SYSTEMS AND METHODS FOR PROVIDING REAL-TIME CLASSIFICATION OF CONTINUOUS DATA STREAMS

(75) Inventors: Charu Chandra Aggarwal, Mohegan Lake, NY (US); Philip Shilung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 11/208,893

(22) Filed: Aug. 22, 2005

(65) Prior Publication Data

US 2007/0043565 A1 Feb. 22, 2007

(51) Int. Cl.
G10L 15/06 (2006.01)
G10L 15/00 (2006.01)
G10L 13/00 (2006.01)

(52) U.S. Cl. ........ 704/245; 704/231; 704/243; 704/246; 704/249; 704/250; 704/267

(58) Field of Classification Search .............. 704/9, 214, 704/238, 245, 256, 272
See application file for complete search history.

(56) References Cited

U.S. PATENT DOCUMENTS

| | | | | |
|---|---|---|---|---|
| 5,835,893 A * | 11/1998 | Ushioda | ...... | 704/257 |
| 6,003,029 A * | 12/1999 | Agrawal et al. | ...... | 1/1 |
| 6,424,946 B1 * | 7/2002 | Tritschler et al. | ...... | 704/272 |
| 6,449,612 B1 * | 9/2002 | Bradley et al. | ...... | 1/1 |
| 6,460,035 B1 * | 10/2002 | Siegwart | ...... | 707/737 |
| 6,687,691 B1 * | 2/2004 | Agrawal et al. | ...... | 1/1 |
| 6,694,303 B1 * | 2/2004 | Agrawal et al. | ...... | 706/52 |
| 6,799,175 B2 * | 9/2004 | Aggarwal | ...... | 1/1 |
| 6,804,648 B1 * | 10/2004 | Basu et al. | ...... | 704/255 |
| 7,415,537 B1 * | 8/2008 | Maes | ...... | 709/246 |
| 7,548,856 B2 * | 6/2009 | Thiesson et al. | ...... | 704/245 |
| 2003/0236663 A1 * | 12/2003 | Dimitrova et al. | ...... | 704/245 |
| 2004/0143434 A1 * | 7/2004 | Divakaran et al. | ...... | 704/256 |
| 2004/0193414 A1 * | 9/2004 | Calistri-Yeh et al. | ...... | 704/245 |
| 2004/0225498 A1 * | 11/2004 | Rifkin | ...... | 704/250 |
| 2005/0038769 A1 | 2/2005 | Aggarwal et al. | ...... | 707/1 |
| 2005/0091057 A1 * | 4/2005 | Phillips et al. | ...... | 704/270.1 |
| 2005/0154654 A1 * | 7/2005 | Berstis et al. | ...... | 705/30 |

OTHER PUBLICATIONS

Kinnunen, "Spectral Features for Automatic Text-Independent Speaker Recognition", Dec. 2003, pp. 1,3,19-21.*

S. Guha et al, "Data Streams and Histograms", in ACM Symposium on Theory of Computing Proceedings (2001), pp. 471-475.*

O'Callaghan et al, "Streaming-Data Algorithms for High-Quality Clustering", in IEEE ICDE Conference Proceedings (2002), pp. 685-696.*

Xu et al, "A Distribution-Based Clustering Algorithm for Mining in Large Spatial Databases", in IEEE ICDE Conference Proceedings, 1998, pp. 324-331.*

Zhang et al, "Fast Density Estimation Using CF-Kernel for Very Large Databases", in ACM KDD Conference Proceedings, 1999, pp. 312-316.*

(Continued)

Primary Examiner — Richemond Dorvil
Assistant Examiner — Olujimi A Adesanya
(74) Attorney, Agent, or Firm — F. Chau & Associates, LLC; William J. Stock, Esq.

(57) ABSTRACT

Systems and methods are provided for real-time classification of streaming data. In particular, systems and methods for real-time classification of continuous data streams implement micro-clustering methods for offline and online processing of training data to build and dynamically update training models that are used for classification, as well as incrementally clustering the data over contiguous segments of a continuous data stream (in real-time) into a plurality of micro-clusters from which target profiles are constructed which define/model the behavior of the data in individual segments of the data stream.

23 Claims, 4 Drawing Sheets

OTHER PUBLICATIONS

C. C. Aggarwal et al., *A Framework for Clustering Evolving Data Streams*, Proceedings of the 29$^{th}$ VLDB Conference, Berlin, Germany, 2003.

C.C. Aggarwal et al., *On Demand Classification of Data Streams*, ACM KDD Conference, Aug. 22-25, 2004.

C. C. Aggarwal et al., *A Framework for Projected Clustering of High Dimensional Data Streams*, Proceedings of the 30$^{th}$ ULDB Conference, Toronto, Canada 2004.

C.C. Aggarwal, *A Framework for Diagnosing Changes in Evolving Data Streams*, ACM SIGMOD Conference, Jun. 9-12, 2003.

\* cited by examiner

SYSTEMS AND METHODS FOR PROVIDING REAL-TIME CLASSIFICATION OF CONTINUOUS DATA STREAMS

GOVERNMENT LICENSE RIGHTS

This invention was made with Government support under Contract No. H98230-04-3-0001 awarded by the U.S. Department of Defense. The Government has certain rights in this invention.

TECHNICAL FIELD OF THE INVENTION

The present invention relates generally to systems and methods for providing real-time classification of continuous data streams and, in particular, to systems and methods for implementing an automated, self-adapting process for classifying an evolving data stream (e.g., voice data stream) using micro-clustering to dynamically build clustering models over contiguous segments of the data stream which are used for classification of the data stream (e.g., speaker identification, detection, segmentation, etc.)

BACKGROUND

Technological innovations in data storage and processing technologies has led to widespread development and implementation of applications for automatically and rapidly recording transactions and activities of everyday life (e.g., banking, credit card and stock transactions, network performance and usage data, etc.). These application domains typically generate fast, continuous data streams that must be continuously collected and analyzed in real-time (or near-real time) for various purposes (e.g., detecting trends and events of interest, identifying abnormal patterns and anomalies, etc.) depending on the application and nature of the streaming data.

In this regard, there has been extensive research in the data streaming domain to develop data processing techniques for real-time processing (e.g., clustering and classification) of fast and continuous data streams. When developing data stream processing applications, it is important that such applications are designed to extract summary information from the data stream in a manner that allows fast and efficient clustering and classification of the data stream, while minimizing the amount of storage and computation resources needed for processing and storing the summary data.

SUMMARY OF THE INVENTION

Exemplary embodiments of the invention generally include systems and methods for providing real-time classification of streaming data. In particular, exemplary embodiments of the invention include systems and methods for real-time classification of continuous data streams, which implement micro-clustering methods for offline and online processing of training data to build and dynamically update training models that are used for classification, as well as incrementally clustering the data over contiguous segments of a continuous data stream (in real-time) into a plurality of micro-clusters from which target profiles are constructed to define/model the behavior of the speech data in the individual segments of the data stream.

In one exemplary embodiment of a method for real-time classification of a continuous data stream includes receiving a continuous data stream and clustering a set of data records in each contiguous segment of the received data stream into a plurality of micro-clusters. Preferably, clustering is performed incrementally as data records are received. A target profile is generated for each segment of the received data stream based on the micro-clusters associated with each segment. The segments of the received data stream are then classified using the target profiles associated with the segments.

In another exemplary embodiment of the invention, a target profile for a given segment is a histogram profile that is generated using summary information of data records associated with the micro-clusters for the given segment. For example, a histogram profile for a given segment is generated based on a relative frequency of data points associated with each micro-cluster of the given segment.

In another exemplary embodiment of the invention, a classification process includes classifying each segment by matching the target profile for a given segment to a similar training profile. In one embodiment, matching is performed using a distance metric to determine a distance between the target profile and each of a plurality of training profiles and determine a training profile that is closest to the target profile. The distance may be determined using a Manhattan distance metric or a Euclidean distance metric, for example.

In yet another exemplary embodiment of the invention, the classification process may be performed by comparing the target profiles over a plurality of contiguous segments of a captured data stream to detect a data pattern or event in the data stream. In another embodiment, the evolution of the target profiles over a plurality of contiguous segments of a captured data stream may be analyzed to cluster the data stream segments into groups of similar segments.

In one exemplary embodiment of the invention, the continuous data stream is a voice data stream, such as a VoIP packet data stream, or any type of quantitative data stream. With continuous voice data streams, classification methods are implemented to perform for real-time speaker identification of the voice data stream or analyze an evolution of the target profiles to detect salient speech patterns or segment different speakers in a voice data stream of unknown speakers.

These and other exemplary embodiments, aspects, features and advantages of the present invention will be described or become apparent from the following detailed description of exemplary embodiments, which is to be read in connection with the accompanying drawings.

DETAILED DESCRIPTION OF EXEMPLARY EMBODIMENTS

In general, exemplary embodiments of the invention as described in further detail hereafter include systems and methods for providing real-time classification of streaming data. In particular, systems and methods for real-time classification of continuous data streams implement micro-clustering methods for offline and online processing of training data to build and dynamically update training models that are used for classification. In addition, the micro-clustering methods are used for incrementally clustering the data over contiguous segments of a continuous data stream (in real-time) into a plurality of micro-clusters from which target profiles are constructed which define/model the behavior of the speech data in the individual segments of the data stream.

Exemplary embodiments of the invention include systems and methods that can be applied in various application environments which require real-time processing and classification of continuous evolving data streams. For instance, the invention can be employed for processing voice data streams (e.g., VoIP streams) for purposes of identifying speakers in the data stream and/or detecting voice patterns within the data stream. For purposes of illustration, exemplary embodiments of the invention will be described in the context of classification of voice data steams for speaker identification/detection applications, although it is to be understood that the systems and methods described herein can be used for processing any quantitative data stream.

In accordance with an exemplary embodiment of the invention, data stream clustering is performed using micro-clustering methods the same or similar to those methods as described in U.S. patent application Ser. No. 10/641,951, which is commonly assigned and fully incorporated herein by reference. In general, this application discloses methods for performing data stream clustering wherein summary statistical information about the data distribution locality is maintained in micro-clusters. These statistical data points are defined as a temporal extension of a cluster feature vector. The micro-clusters are stored as snapshots in time, which follow a specific pattern that provides an effective trade-off between the storage requirements and the ability to recall summary statistics from different time horizons.

More specifically, in one exemplary embodiment, a micro-clustering method as described hereafter is employed for clustering data streams (training data or test data). It is assumed that the data stream (training data or target data stream) comprises a set of multi-dimensional records $X_1 \ldots X_K \ldots$, (or data points) arriving at time stamps $T_1 \ldots T_K \ldots$ Each data point $X_i$ denotes a multi-dimensional record containing d dimensions which are denoted by $X_i = x_i^1 \ldots x_i^d$. In the context of voice data contained in VoIP packets, each data point $X_i$ may represent a d-dimensional feature vector in a given VoIP packet, which represents speech data over a small time window (segment) of an acoustic data stream. Clustering involves partitioning a set of data points into one or more groups (micro clusters) of similar data points. Clustering is performed such a maximum number of micro-clusters is maintained at any given time.

In one exemplary embodiment of the invention, the summary data for a given set of similar d-dimensional points $X_{i_1} \ldots X_{i_n} \ldots$ with time stamps $T_{i_1} \ldots T_{i_n} \ldots$ is maintained in a micro-cluster defined as a $2 \cdot d + 2$ tuple $(CF2^x, CF1^x, CF1^t, n)$, wherein $\{CF2^x\}$ and $\{CF1^x\}$ each correspond to a vector of d entries, which represent a second order moment and first order moment, respectively, for the data points of the given micro-cluster. In particular, for each dimension d, the sum of the squares of the data values is maintained in $\{CF2^x\}$. Thus, $\{CF2^x\}$ contains d values. Moreover, for each dimension d, the sum of the data values is maintained in $\{CF1^x\}$. Thus, $\{CF1^x\}$ contains d values. Further, the last update time for the cluster is maintained in $\{CF1^t\}$ (time stamp of the last data record that was entered in the given micro-cluster). Finally, the number of data points is maintained in n.

The micro-clustering process maintains statistical information about the dominant micro-clusters in the data stream at any given moment in time. The process ensures that a very large number of micro-clusters can be efficiently maintained. The micro-clusters are stored at particular moments in the data stream, which are referred to as snapshots. For each snapshot, the micro-clusters provide a cluster model that can be utilized for constructing target profiles for individual segments of a continuous data stream, which are used for on-line classification. Moreover, during a training process, the micro-clusters that are derived from training data associated with a given speaker can be used to create a speaker-specific profile. Speaker-specific profiles can be used during classification to identify speakers in a continuous speech data stream.

Exemplary systems and methods for real-time process of continuous data streams will now be discussed in further detail with reference to illustrative embodiments of FIGS. 1-5. It is to be understood that the exemplary systems and methods described herein may be implemented in various forms of hardware, software, firmware, special purpose processors, or a combination thereof. In particular, the present invention may be implemented in software as an application comprising program instructions that are tangibly embodied on one or more program storage devices (e.g., hard disk, magnetic floppy disk, RAM, CD Rom, DVD, ROM and flash memory), and executable by any device or machine comprising a suitable architecture. It is to be further understood that because the constituent system modules and method steps depicted in the accompanying Figures may be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
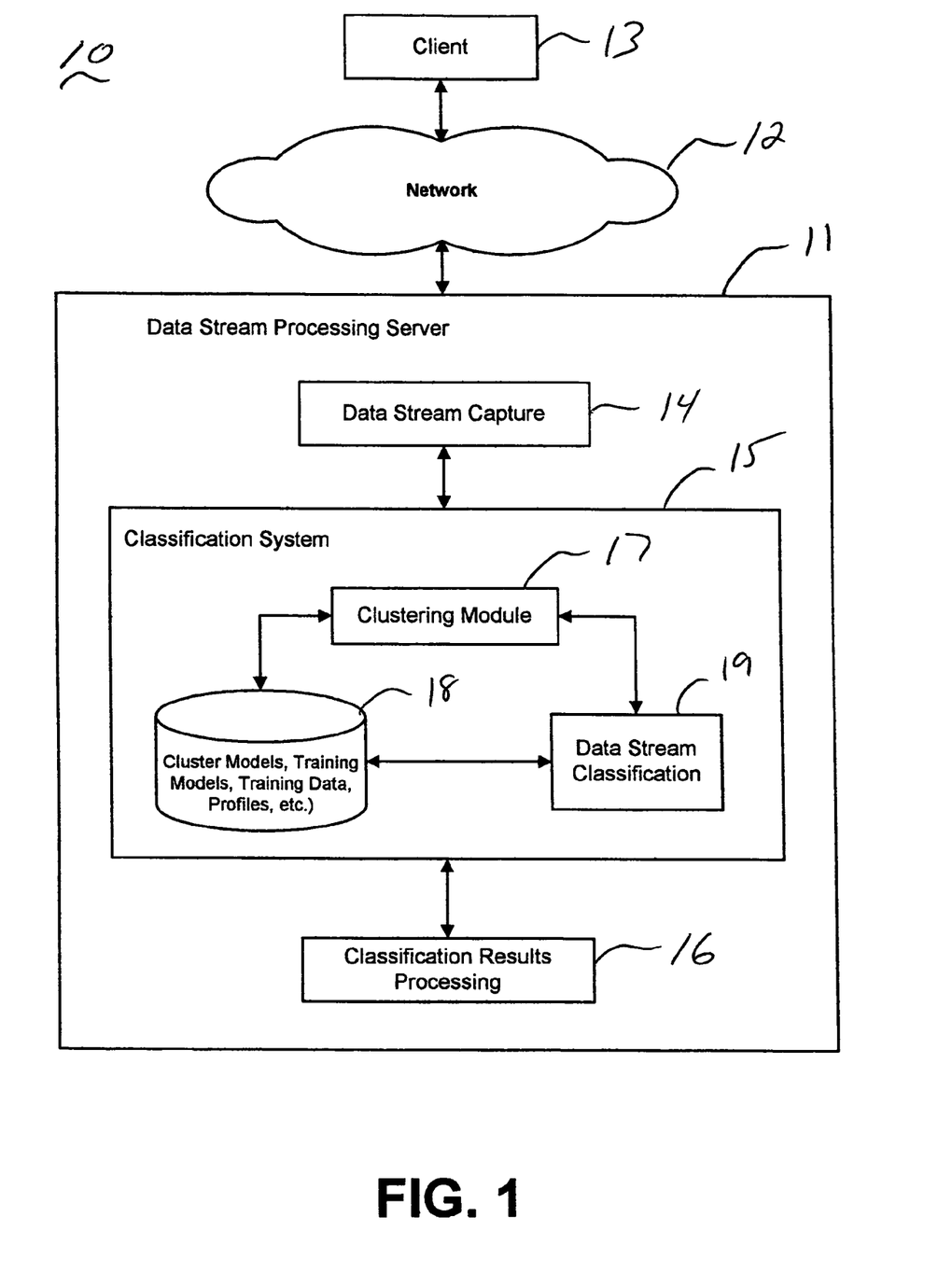
FIG. 1 is a high-level block diagram of a system for real-time classification of continuous data streams according to an exemplary embodiment of the invention.

FIG. 1 is a high-level block diagram of a system (10) for real-time data stream classification according to an exemplary embodiment of the invention. In general, the system (10) comprises a data stream processing server (11) that can perform real-time processing of data streams received over a network (12) from one or more clients (13). In one exemplary embodiment, the server (11) performs real-time classification of VoIP data streams for applications such as speaker identification, speaker detection, and other types of pattern recognition of speech data, etc. However, the system (11) can be utilized for real-time processing of any quantitative data stream.

The server (11) comprises a data stream capture module (14), a classification system (15) and a classification results processing system (16). The data stream capture module (14) captures a target data stream (voice data stream) off the network (12). The classification system (15) implements methods for real-time clustering and classification of captured data streams. In other exemplary embodiments of the invention, the classification system (15) implements methods for both offline and online training. The classification results processing system (16) processes the classification results for one or more purposes, depending on the application.

The classification system (15) comprises a clustering module (17), an application data repository (18) and a data stream classification module (19). The clustering module (17) implements micro-clustering methods as described above for performing stream-specific clustering of training data streams to generate speaker-specific profiles from the clustered data, as well as incrementally clustering a target data stream to generate target profiles for contiguous segments of the target data stream. The micro-cluster models, speaker-specific profiles, target profiles, training data, etc., are persistently stored in the data repository (18).

In general, the classification module (19) implements methods for classifying a target data stream. For instance, the classification module (19) implements one or more methods for comparing target profiles (which are generated as a result of the clustering process) with training profiles (speaker-specific profiles) stored in the database (18) for classifying individual segments of the data stream. Such classification includes, but is not limited to, speaker recognition and identification. In addition, the classification module (19) implements methods for automated analysis of the evolution of target profiles that are constructed over contiguous segments of the data stream so as to detect certain events or changes in the target data stream, or otherwise detect salient patterns in the streaming data. Details regarding modes of operation of the data stream processing system (11) and the constituent components will be explained in further detail below with reference to the illustrative embodiments of FIGS. 2-5, for example.

Figure 2:
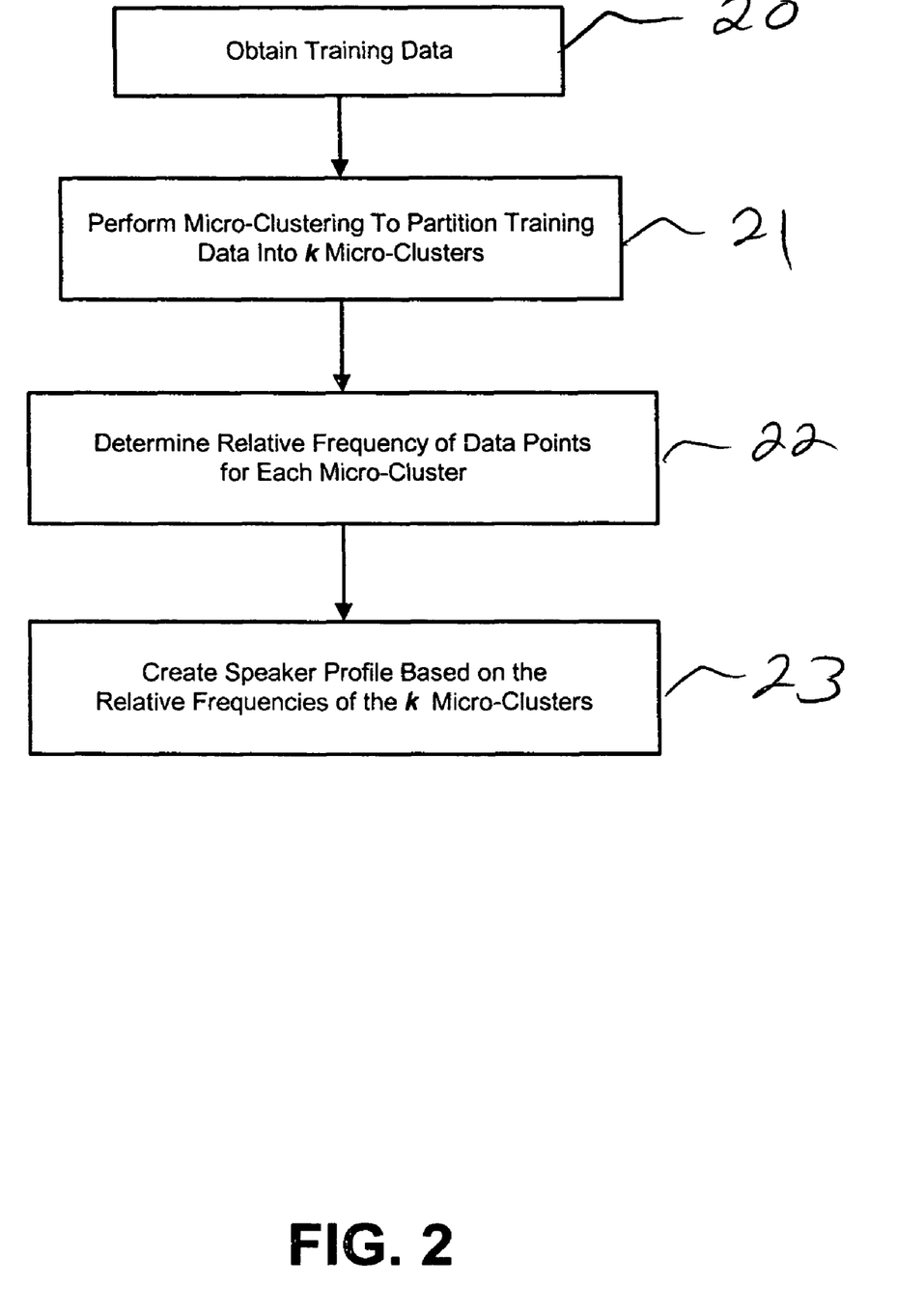
FIG. 2 is a flow diagram of a method for constructing classification models according to an exemplary embodiment of the invention.

FIG. 2 is a flow diagram that illustrates a method for constructing classification models according to an exemplary embodiment of the invention. In particular, FIG. 2 is a flow diagram illustrating a method for building and dynamically updating/adapting training profiles (e.g., speaker-specific profiles) that are used for real-time classification of voice data streams. The exemplary method of FIG. 2 can be used by the classification system (15) in FIG. 1 for performing on-line and off-line training of speaker-specific profiles. In one exemplary embodiment of the invention, a training process includes performing micro-clustering of training data (which includes voice data of known speakers) to model the behavior of the underlying data in a set of micro-clusters and construct speaker-specific profiles based on the resulting clusters. The training data for a given speaker may comprises a stream of d-dimensional feature vectors that are produced (on a frame-by-frame basis) for each of a plurality of contiguous frames of acoustic speech data of the speaker, where each frame represents, e.g., 10 ms of the input acoustic data stream.

Referring to FIG. 2, an initial step is to obtain training data for a given (known) speaker (step 20). As noted above, training may be performed to generate new speaker-specific profiles or dynamically update/adapt existing profiles. In this regard, the training data may be static training data (labeled speech data) that is obtained from a database of known training speakers and used to generate new speaker-specific profiles. In another embodiment, the training data for a given speaker may be obtained from target data streams during on-line processing and classification of the target data stream. In this regard, the speaker-specific profile for a given speaker may be dynamically updated/adapted using a new set of training data, which includes a combination of the static data previously used to generate the current profile and new training data extracted from target data streams during online processing. In other words, as more training data for a given speaker is collected over a period of time, the additional data can be used to update the speaker-specific profile. In both cases, only a single pass of the data stream is required, and therefore the training process is as fast and efficient as that of the real-time testing process.

Next, the training data for a given speaker is processed using a micro-clustering process (step 21) to partition the training data into a set of k micro-clusters. The set of k micro-clusters is a clustering model that is used to generate a signature which defines a speaker specific profile. In one exemplary embodiment of the invention, the speaker-specific profile for a given speaker is constructed based on the relative frequencies of the data points assigned to the different clusters over the set of k micro-clusters for the given speaker.

In particular, for a given speaker, the relative frequencies of the data points is determined for each micro-cluster (step 22), wherein the relative frequency of a given micro-cluster is determined as the ratio of the number of data points of the given cluster to the total number of data points in the set of k micro-clusters. The relative frequencies of the micro-clusters are used to construct a signature which represents a speaker-specific profile for the speaker (step 23). For example, the relative frequencies for the different micro-clusters are denoted by the tuple $[V_1 \ldots Vk]$, which represent a signature (training profile) for the speaker. By way of example, assume a micro-clustering process is applied to training data consisting of 35 data points, and generates k=5 micro-clusters having. 6, 9, 5, 10, and 5 data points, respectively. In such a case, the relative frequency in each of the histogram bins is equal to 6/35, 9/35, 5/35, 10/35, and 5/35, and the training profile would be represented as [6/35, 9/35, 5/35, 10/35, 5/35]. It is to be noted that normalization of the tuple data is achieved by virtue of relative frequencies.

Figure 3:
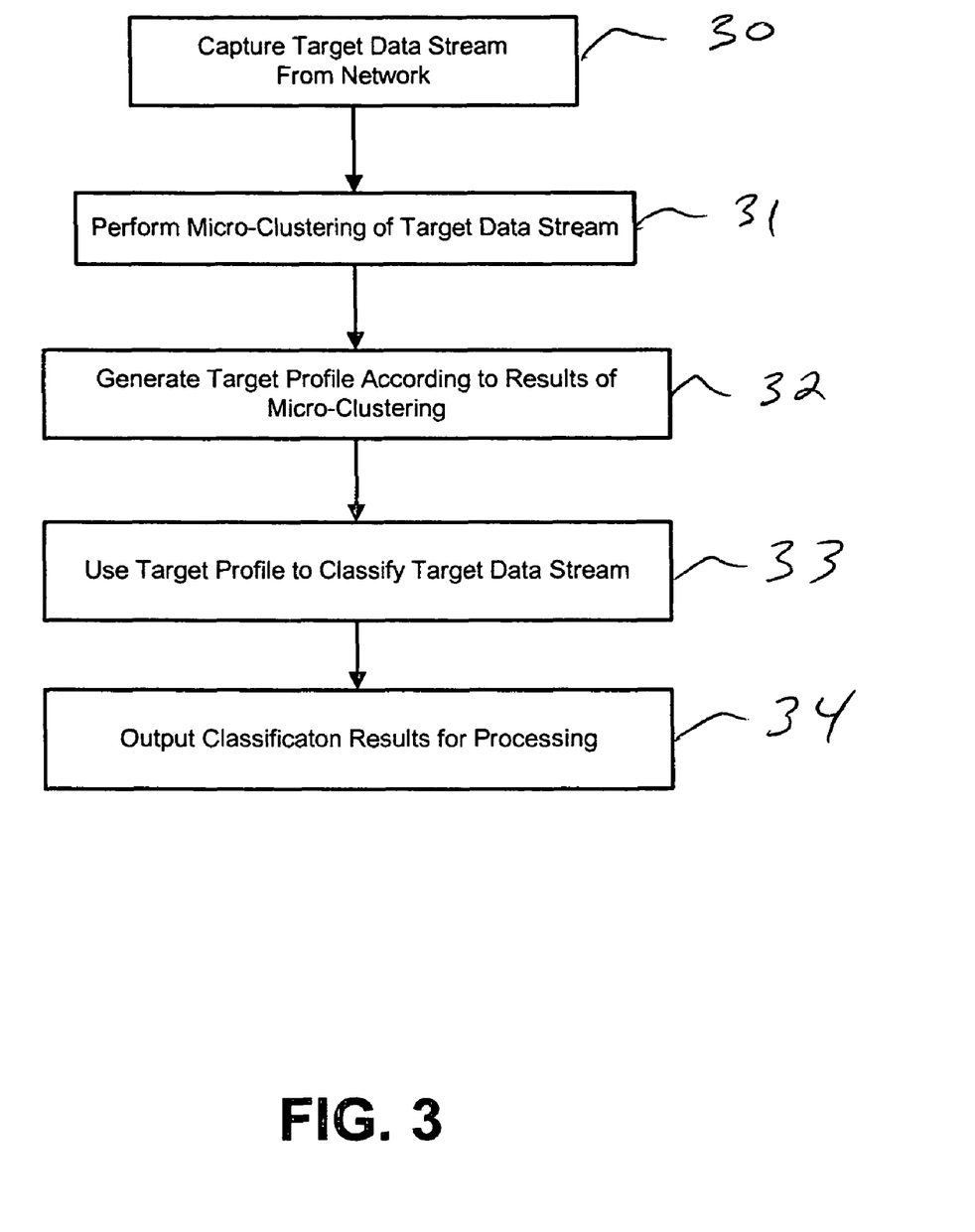
FIG. 3 is a flow diagram of a method for real-time classification of continuous data streams according to an exemplary embodiment of the invention.
Figure 4:
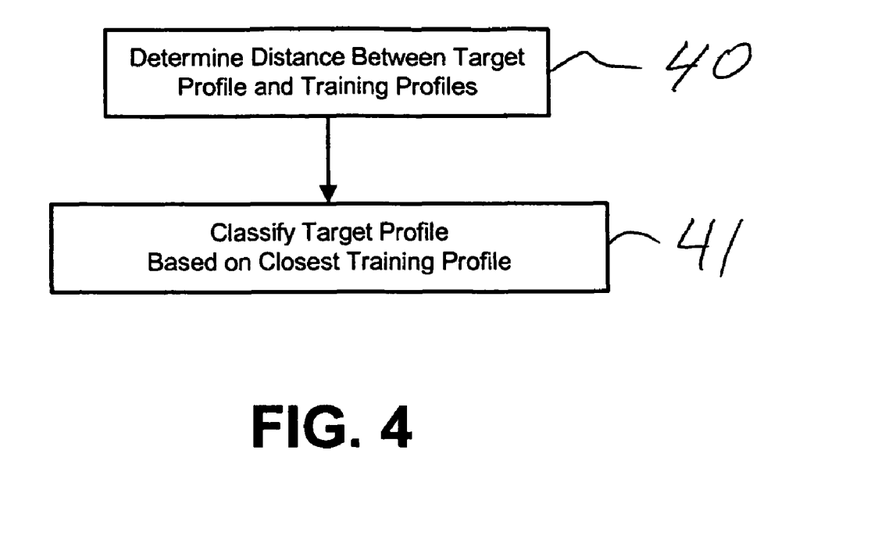
FIG. 4 is a flow diagram of a method for comparing target profiles with training profiles for classifying continuous data streams, according to an exemplary embodiment of the invention.

FIG. 3 is a flow diagram illustrating a method for real-time data stream classification according to an exemplary embodiment of the invention. In one exemplary embodiment of the invention, network traffic is monitored and a target data stream is captured off the network (step 30). By way of example, the target data stream may be a voice data stream being transmitted over a network in VoIP packets. As noted above, each VoIP packet includes a payload that contains a d-dimensional feature vector representation of a speech segment. In this regard, each VoIP packet may be regarded as a data point.

As data points in the continuous data stream are captured, a micro-clustering process is performed to partition the data points into a plurality of micro-clusters (step 31) using the same micro-clustering methods as those used for clustering the training data (as described above). It is to be understood that the micro-clustering and data capturing steps are concurrently performed in real-time, whereby at any given moment of time, statistical information of the data stream is maintained in a set of k micro-clusters. As data points are captured, the data points are placed into existing or new micro-clusters based on some similarity measure of the data point to data points within the micro-clusters. The similarity measure can be based on any suitable distance measure or objective function. The micro-clusters are stored at particular moments in the data stream, referred to as snapshots. In this regard, each snapshot includes a set of k micro-clusters, which defines a clustering model for a given set of data points in a segment of the data stream. The clusters are incrementally computed over contiguous segments of the data stream at user-defined periods of time as more data points the data stream are received.

Once a cluster model is constructed for a given segment of the data stream, a target profile can be constructed for the given segment (step 32). In general, the target profile for a given segment is constructed using a metric based on information derived from the cluster model associated with the segment. By way of example, in one exemplary embodiment, the relative frequencies of the data points is determined for each micro-cluster of the segment based on the total number of data points associated with the segment and the number of data points associated with each of the micro-clusters. In particular, as noted above, the relative frequency of a given micro-cluster is determined as the ratio of the number of data points of the given cluster to the total number of data points over all of the k micro-clusters. The target profile for a given segment of the data stream is represented by the tuple $[V_1' \ldots Vk']$.

The target profiles that are constructed for the data stream segments can be used to classify the target data stream (step 33). Various methods may be employed in accordance with the invention to classify the target data stream using the target profiles. For instance, in one exemplary embodiment of the invention as depicted by the flow diagram of FIG. 4, speaker identification can be performed using some distance measure to determine the distance between the target profile of a given segment and each of the training profiles (speaker-specific profiles) (step 40). The target profile for a given segment will be classified based on the training profile that is determined to be the closest to the target profile (step 41), whereby the closest training profile is reported as the final speaker ID for the given segment.

In another exemplary embodiment of the invention, the evolution of target profiles over contiguous segments of the data stream can be analyzed to detect changes, events, patterns, etc., in the data stream. Indeed, since the clusters of the data stream segments are computed over a user-defined time period, the clusters of previous and current segments can be compared to identify and detect changes, events, etc., over specified time horizons of the data stream.

In particular, by way of example, a change detection process can be implemented by determining the differences between the histogram structure (target profile) over different segments of the data stream. These differences in the histogram structure can be analyzed to determine whether significant changes have occurred in the data stream. For example, in a speech data stream generated by multiple speakers conversing, even if training profiles are not available for the different speakers, the changing structure of the target profiles over the speech data stream can be used to segment the data stream into the different speakers.

The classification results are output for further processing (step 34). It is to be understood that the manner in which the classification results are further processed or utilized will vary depending on the application. By way of example, assuming the classification results are the results of speaker identification wherein each segment of the data stream is classified based on the closest training profile (as discussed above), the classification results can be further processed using a Bayesian objective function to accumulate the conditional probabilities over the different segments of the stream to perform the final speaker identification.

Figure 5:
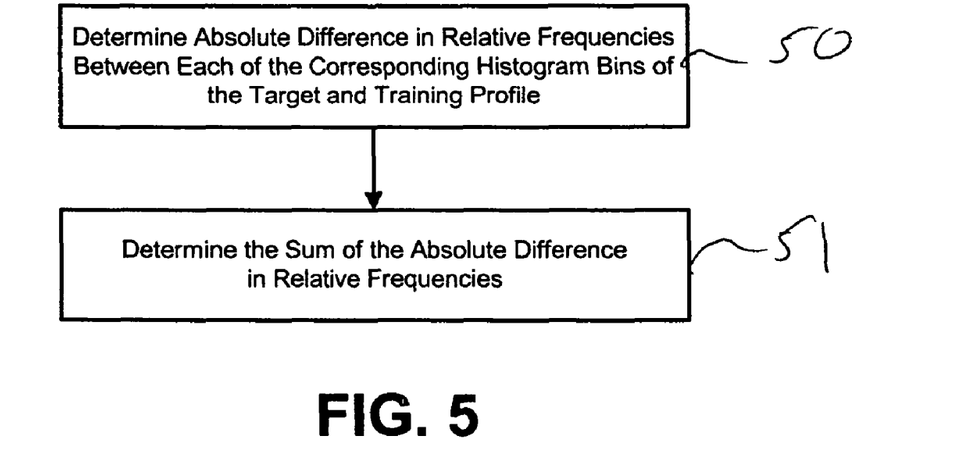
FIG. 5 is a flow diagram of a method for determining the distance between a target profile and a training profile according to an exemplary embodiment of the invention.

It is to be appreciated that any suitable distance measure may be used (in step 40, FIG. 4) to determine the distance between a target profile and the training profiles. For example, FIG. 5 is a flow diagram that illustrates a method for determining a distance between a target and training profiles according to an exemplary embodiment of the invention. In particular, FIG. 5 illustrates a method for determining the Manhattan distance between a target profile, $[V_1' \ldots Vk']$ and each training profile $[V_1 \ldots Vk]$. As noted above, tuple components $V_i'$ and $V_i$ of the target and training profiles represent the relative frequencies of over the different histogram bins (of the micro-clusters). To compute the Manhattan distance between a target and training profile, a first step is to determine the absolute difference in relative frequencies between each of the corresponding histogram bins of the target and training profiles (step 50). Then, the sum of the absolute differences in relative frequencies (as determined in step 50) is determined as the Manhattan distance between the two profiles (step 51).

In other words, the Manhattan distance, D, between a target profile $[V_1' \ldots Vk']$ and a training profile $[V_1 \ldots Vk]$ is the sum of the differences of their corresponding tuple components, as follows:

$$D = \sum_{i=1}^{k} |Vi - Vi'|.$$

The Manhattan distance may be used to determine the closest speaker to the target profile for a given segment in the data stream.

In other exemplary embodiments of the invention, a Euclidean distance metric can be used to determine the distance between a target and training profile. In particular, the Euclidean distance, D, between a target profile $[V_1' \ldots Vk']$ and a training profile $[V_1 \ldots Vk]$ is determined as the square root of the sum of the squares of the differences between the corresponding tuple components as follows:

$$D = \sqrt{\sum_{i=1}^{k}(Vi - Vi')^2}.$$

It is to be understood that the clustering methods described herein are merely exemplary of clustering methods that can be used for real-time classification of continuous data streams, and that other clustering methods may be used depending upon the dimensionality and/or nature of the target data stream. For example, for very high dimensional data streams, the clustering methods described in the article by Aggarwal, et al., entitled "*A Framework for High Dimensional Projected Clustering of Data Streams*", Proceedings of the VLDB Conference, 2004, may be utilized for effectively removing the effects of noise associated with a large number of dimensions.

Another method which can be used to optimize real-time clustering and classification involves feature selection. For example, a GINI index of the different features (dimensions) can be computed with respect to each speaker using methods known in the art. The GINI index can be used to determine the relative importance of different features for classification. In this regard, only the most important features can be selected to thereby prune the search space for the classification process. In other embodiments, entropy computations can be used for pruning the feature space, using methods known to those of ordinary skill in the art.

Although exemplary embodiments of the invention have been described herein with reference to the accompanying drawings, it is to be understood that the invention is not limited to these exemplary, and that various other changes and modifications may be effected therein by one skilled in the art without departing from the scope or spirit of the invention. All such changes and modifications are intended to be included within the scope of the invention as defined by the appended claims.

We claim:

1. A method for real-time classification of a continuous data stream by a data stream processing server comprising a processor and implementing a classification module, the method comprising:

receiving a continuous data stream by the data stream processing server;

clustering, incrementally, a set of data records in each contiguous segment of the received data stream into a plurality of micro-clusters, wherein the plurality of micro-clusters is stored as a snapshot in time, the snapshot updating with time and indicating a dominant micro-cluster in the data stream;

generating a target profile for each segment of the received data stream based on the snapshot of micro-clusters associated with each segment, wherein generating the target profile comprises generating a histogram profile for a given segment using summary information of data records associated with the micro-clusters for the given segment, wherein the histogram profile is generated based on relative frequencies of data points associated with each micro-cluster for the given segment as compared to a total number of data points in the micro-clusters for the given segment; and classifying, by the classification module, each segment of the received data stream using the target profile associated with each segment.

2. The method of claim 1, wherein classifying comprises classifying each segment by matching the target profile for a given segment to a similar training profile.

3. The method of claim 2, wherein matching comprises determining a distance between the target profile and each of a plurality of training profiles to determine a training profile that is closest to the target profile.

4. The method of claim 3, wherein determining a distance between the target profile and a training profile comprises determining a Manhattan distance between said profiles.

5. The method of claim 3, wherein determining a distance between the target profile and a training profile comprises determining a Euclidean distance between said profiles.

6. The method of claim 1, wherein classifying comprises comparing the target profiles over a plurality of segments to detect a data pattern in the data stream.

7. The method of claim 1, wherein classifying comprises comparing the target profiles over a plurality of segments to detect an event in the data stream.

8. The method of claim 1, wherein classifying comprises comparing the target profiles over a plurality of segments to cluster the segments into groups of segments.

9. The method of claim 1, wherein the continuous data stream is a voice data stream.

10. The method of claim 9, wherein classifying comprises performing real-time speaker identification of the voice data stream.

11. The method of claim 9, wherein the voice data stream comprises a stream of VoIP packets.

12. A non-transitory program storage device readable by machine, embodying a program of instructions executable by a processor of the machine to perform method steps for real-time classification of a continuous data stream, the method steps comprising:

receiving a continuous data stream;

clustering, incrementally, speech data in each contiguous segment of the received data stream into a plurality of micro-clusters, wherein the plurality of micro-clusters is stored as a snapshot in time, the snapshot updating with time and indicating a dominant micro-cluster in the data stream;

generating a target profile for each segment of the received data stream based on the snapshot of micro-clusters associated with each segment, wherein generating the target profile comprises generating a histogram profile for a given segment using summary information of data records associated with the micro-clusters for the given segment, wherein the histogram profile is generated based on relative frequencies of data points associated with each micro-cluster for the given segment as compared to a total number of data points in the micro-clusters for the given segment; and classifying each segment of the received data stream using the target profile associated with each segment.

13. The non-transitory program storage device of claim 12, wherein the instructions for classifying comprise instructions for classifying each segment by matching the target profile for a given segment to a similar training profile.

14. The non-transitory program storage device of claim 13, wherein the instructions for matching comprise instructions for determining a distance between the target profile and each of a plurality of training profiles to determine a training profile that is closest to the target profile.

15. The non-transitory program storage device of claim 14, wherein the instructions for determining a distance between the target profile and a training profile comprise instructions for determining a Manhattan distance between said profiles.

16. The non-transitory program storage device of claim 14, wherein the instructions for determining a distance between the target profile and a training profile comprise instructions for determining a Euclidean distance between said profiles.

17. The non-transitory program storage device of claim 12, wherein the instructions for classifying comprise instructions for comparing the target profiles over a plurality of segments to detect a data pattern in the data stream.

18. The non-transitory program storage device of claim 12, wherein the instructions for classifying comprise instructions for comparing the target profiles over a plurality of segments to detect an event in the data stream.

19. The non-transitory program storage device of claim 12, wherein the instructions for classifying comprise instructions for comparing the target profiles over a plurality of segments to cluster the segments into groups of segments.

20. The non-transitory program storage device of claim 12, wherein the continuous data stream is a voice data stream.

21. The non-transitory program storage device of claim 20, wherein the instructions for classifying comprise instructions for performing real-time speaker identification of the voice data stream.

22. The non-transitory program storage device of claim 20, wherein the voice data stream comprises a stream of VoIP packets.

23. A system for processing continuous data streams, comprising:

a data stream capturing system to capture a target data stream over a network;

a data clustering system that incrementally clusters a set of data records in each contiguous segment of the captured data stream into a plurality of micro-clusters, wherein the plurality of micro-clusters is stored as a snapshot in time, the snapshot updating with time and indicating a dominant micro-cluster in the target data stream, and generates a target profile for each segment of the captured data stream based on the snapshot of micro-clusters associated with each segment, wherein generating the target profile comprises generating a histogram profile for a given segment using summary information of data records associated with the micro-clusters for the given segment, wherein the histogram profile is generated based on relative frequencies of data points associated with each micro-cluster for the given segment as compared to a total number of data points in the micro-clusters for the given segment; and a classification system to classify each segment of the captured data stream using the target profile associated with each segment.

* * * * *